United States Patent
Stark et al.

(10) Patent No.: US 12,521,136 B2
(45) Date of Patent: Jan. 13, 2026

(54) MEDICAL INSTRUMENT

(71) Applicant: Aesculap AG, Tuttlingen (DE)

(72) Inventors: Christian Stark, Tuttlingen (DE); Gilles Roland Waeldin, Pulau Penang (MY)

(73) Assignee: Aesculap AG, Tuttlingen (DE)

( * ) Notice: Subject to any disclaimer, the term of this patent is extended or adjusted under 35 U.S.C. 154(b) by 65 days.

(21) Appl. No.: 18/719,469

(22) PCT Filed: Dec. 14, 2022

(86) PCT No.: PCT/EP2022/085868
§ 371 (c)(1),
(2) Date: Jun. 13, 2024

(87) PCT Pub. No.: WO2023/111027
PCT Pub. Date: Jun. 22, 2023

(65) Prior Publication Data
US 2025/0049458 A1      Feb. 13, 2025

(30) Foreign Application Priority Data
Dec. 15, 2021   (EP) .................................... 21214904

(51) Int. Cl.
*A61B 17/28*       (2006.01)
*A61B 17/00*       (2006.01)

(52) U.S. Cl.
CPC ........ *A61B 17/282* (2013.01); *A61B 17/2816* (2013.01); *A61B 17/2841* (2013.01); *A61B 2017/00473* (2013.01)

(58) Field of Classification Search
CPC .......... A61B 17/282; A61B 2017/2825; A61B 2017/2829; A61B 2017/2931; A61B 2017/294
See application file for complete search history.

(56) References Cited

U.S. PATENT DOCUMENTS

| | | |
|---|---|---|
| 3,670,415 A | 6/1972 | Rose |
| 4,597,385 A | 7/1986 | Watson |
| | (Continued) | |

FOREIGN PATENT DOCUMENTS

| | | |
|---|---|---|
| CN | 102058423 A | 5/2011 |
| CN | 207898524 U | 9/2018 |
| | (Continued) | |

OTHER PUBLICATIONS

Search Report received in International Application No. PCT/EP2022/085868 dated Mar. 21, 2023, 3 pages.

*Primary Examiner* — Shaun L David
(74) *Attorney, Agent, or Firm* — Christopher A. Rothe; CM Law (57) ABSTRACT

A medical instrument includes two pivotally coupled branches. Each branch has a handling portion and a jaw portion. The jaw portions form a mouth which is movable between a closed state, in which the jaw portions are moved inwardly, and an open state, in which the jaw portions are moved outwardly. At least one branch includes a branch member and jaw member. The branch member includes one of the handling portions and a coupling. The jaw member forms one of the jaw portions and has a complementary coupling. The coupling and complementary coupling form a releasable connection to exchangeably attach the jaw member to the branch member. The coupling includes two wedge surfaces opposing each other along a medial/lateral axis. The wedge surfaces are inclined proximally toward each other by a first angle of inclination, and inclined inwardly toward each other by a second angle of inclination.

4 Claims, 7 Drawing Sheets

(56) References Cited

U.S. PATENT DOCUMENTS

| | | | | |
|---|---|---|---|---|
| 4,612,708 | A * | 9/1986 | Hattori | A61B 17/3201 |
| | | | | 30/260 |
| 5,086,563 | A * | 2/1992 | Sakuma | B26B 13/04 |
| | | | | 30/341 |
| 5,591,182 | A * | 1/1997 | Johnson | A61B 17/29 |
| | | | | 606/151 |
| 6,228,104 | B1 * | 5/2001 | Fogarty | A61B 17/282 |
| | | | | 606/207 |
| 6,293,954 | B1 * | 9/2001 | Fogarty | A61B 17/282 |
| | | | | 606/205 |
| 9,028,492 | B2 * | 5/2015 | Kerr | A61B 18/1445 |
| | | | | 606/51 |
| 10,856,896 | B2 * | 12/2020 | Eichmann | A61B 17/1606 |
| 2002/0049470 | A1 * | 4/2002 | Fogarty | A61B 17/282 |
| | | | | 606/205 |
| 2002/0111650 | A1 * | 8/2002 | Fogarty | A61B 17/282 |
| | | | | 606/207 |
| 2003/0171747 | A1 * | 9/2003 | Kanehira | A61B 18/085 |
| | | | | 606/45 |
| 2006/0161182 | A1 * | 7/2006 | Vandenbroek | A61B 17/128 |
| | | | | 606/142 |
| 2012/0116433 | A1 * | 5/2012 | Houser | A61B 18/04 |
| | | | | 606/169 |
| 2013/0018372 | A1 * | 1/2013 | Sims | A61B 17/285 |
| | | | | 29/434 |
| 2017/0056060 | A1 * | 3/2017 | Dickerson | A61B 17/320092 |

FOREIGN PATENT DOCUMENTS

| | | |
|---|---|---|
| CN | 208002861 U | 10/2018 |
| CN | 213465224 U | 6/2021 |
| EP | 1187564 A1 | 3/2002 |
| FR | 3029402 A1 | 6/2016 |

* cited by examiner

MEDICAL INSTRUMENT

CROSS-REFERENCE TO RELATED APPLICATIONS

This application is the United States national stage entry of International Application No. PCT/EP2022/085868, filed on Dec. 14, 2022, and claims priority to European Application No. 21214904.1, filed on Dec. 15, 2021. The contents of International Application No. PCT/EP2022/085868 and European Application No. 21214904.1 are incorporated by reference herein in their entireties.

FIELD

The invention relates to a medical instrument, comprising two instrument branches pivotally coupled to each other, each of the instrument branches having a proximal handling portion and a distal jaw portion, the distal jaw portions forming an instrument mouth which is movable, by a pivotal movement of the instrument branches, between a closed state, in which the jaw portions are moved inwardly toward each other, and an open state, in which the jaw portions are moved outwardly away from each other, wherein at least one of the instrument branches comprises a branch member and a jaw member, the branch member being elongated along a proximal/distal axis and having one of the proximal handling portions and a distal coupling portion, the jaw member forming one of the jaw portions and having a proximal complementary coupling portion, and wherein the coupling portion and the complementary coupling portion form a releasable connection to exchangeably attach the jaw member to the branch member.

BACKGROUND

CN 207898524 U discloses a medical instrument in the form of a detachable interchangeable surgical scissor. The surgical scissor comprises two instrument branches pivotally coupled to each other. Each of the instrument branches comprises an elongated branch member and a jaw member, wherein the jaw member is in the form of a blade. The blades are exchangeably attached to the respective branch member by means of a dovetail joint which is fastened with a separate screw member. Hence, exchanging the blades requires medical staff to loosen and fasten the screw members with the help of an additional mechanical tool, e.g. a screwdriver or the like.

SUMMARY

It is an object of the present invention to provide a medical instrument of the type mentioned at the beginning, which has a simplified structure and enables a particularly secure attachment as well as a simple and quick exchange of the jaw member.

According to the invention the coupling portion is a wedge-shaped protrusion and the complementary coupling portion is a complementary wedge-shaped recess, or vice versa, wherein the wedge-shaped protrusion comprises two wedge surfaces opposing each other along a medial/lateral axis, wherein the opposing wedge surfaces are inclined in proximal direction toward each other by a first angle of inclination, and wherein the opposing wedge surfaces are inclined inwardly toward each other by a second angle of inclination.

The invention eliminates the need of separate fastening means like screws, pins, fasteners, or the like to securely attach the jaw member to the branch member. This leads to a simplified structure of the medical instrument. The simplified structure allows to cut manufacturing effort and associated costs. In contrast to the prior art, designing the coupling portion and the complementary coupling portion according to the invention allows to attach and detach the jaw member without the use of tools and with only little manual effort. This saves time and labor and thus enables a simple and particularly quick exchange of the jaw member, if required.

The wedge-shaped recess is configured to snugly receive the wedge-shaped protrusion. The wedge-shaped protrusion is configured to snugly fit into the wedge-shaped recess. It goes without saying that, since the wedge-shaped recess is complementary to the wedge-shaped protrusion, it comprises two wedge (recess) surfaces being complementary to the two wedge surfaces of the wedge-shaped protrusion. Hence, the two wedge (recess) surfaces oppose each other along the medial/lateral axis, are inclined in proximal direction toward each other by the first angle of inclination and are inclined inwardly toward each other by the second angle of inclination.

The wedge surfaces of the wedge-shaped protrusion interact with the wedge (recess) surfaces of the wedge-shaped recess by positive engagement (form fit) and friction engagement (friction fit). Put in other words, the jaw member is exchangeably attached to the branch member by positive engagement and by friction engagement between the wedge-shaped protrusion and the complementary wedge-shaped recess.

The inclination of the wedge surfaces in proximal direction causes a form fit in distal direction and a friction fit in proximal direction. Said form fit in distal direction prevents the jaw member from being pulled off the branch member in distal direction. Said frictional connection in proximal direction counteracts a relative movement of the jaw member in the proximal direction.

The (additional) inclination of the wedge surfaces in inward direction, i.e., in closing direction of the instrument mouth, causes a form fit in outward direction, i.e., in opening direction of the instrument mouth, and a friction fit in inward direction. Said form fit in outward direction prevents the jaw member from moving relative to the branch member in outward direction. Said friction fit in inward direction counteracts a relative movement of the jaw member in inward direction, especially when the instrument mouth is opened.

In one embodiment, the wedge-shaped protrusion is formed on the branch member and the wedge-shaped recess is formed on the jaw member. In another embodiment, the wedge-shaped protrusion is formed on the jaw member and the wedge-shaped recess is formed on the branch member.

In one embodiment, the first angle of inclination measures between 10° and 30°, preferably between 15° and 25°, more preferably between 17.5° and 22.5°. The inventors have recognized that the above value ranges are particularly advantageous. Selecting a rather large first angle of inclination allows for a reliable positive engagement (form fit) of the jaw member in distal direction. Selecting a rather small first angle of inclination leads to relatively high frictional forces between the wedge surfaces and the wedge recess surfaces in proximal direction. The inventors have found that selecting the first angle of inclination between 17.5° and 22.5° leads to an optimum with respect to both, positive and frictional engagement.

In one embodiment, the second angle of inclination measures between 10° and 30°, preferably between 15° and 25°, more preferably between 17.5° and 22.5°. Selecting a rather small second angle of inclination results in relatively high frictional forces in inward direction. The higher the frictional forces in inward direction, the more reliable the jaw member is held at the distal end of the branch member in the open state of the instrument mouth. However, a too small second angle of inclination may lead to excessive frictional forces which can result in the jaw member being difficult to detach from the branch member. The inventors have recognized that selecting the second angle of inclination between 17.5° and 22.5° allows for a secure frictional engagement in inward direction and a relatively easy detachment at the same time.

Another object of the present invention is to provide a kit that allows to reduce manufacturing costs and purchasing costs for medical instruments.

The kit comprises a medical instrument according to the invention. The medical instrument can be, in particular, a hand instrument (for example as per FIG. 1), an endoscopic instrument and/or a robotic arm instrument. The kit also comprises a plurality of different jaw members, the different jaw members comprising identical complementary coupling portions configured for releasable connection to the coupling portion of the at least one branch member. The kit according to the invention allows to optimize the manufacturing process. It also allows to manage and choose the different jaw members separately from the remaining parts and portions of the medical instrument at the medical environment, for example in the surgical theater. Hence, medical staff is able to select and attach the jaw member of the plurality of different jaw members most suitable for a particular medical and/or surgical task. Put in other words, the kit may serve as an exchangeable interface for different handles. The different jaw members are identical with respect to the complementary coupling portion. In one embodiment, the coupling portions are formed as wedge-shaped recesses. In another embodiment, the complementary coupling portions are formed as wedge-shaped protrusions. The wedge-shaped recesses (or wedge-shaped protrusions) of the different jaw members are identical in dimensional features such as size, form, shape. In embodiments, the different jaw members differ with respect to size, shape, form, function or the like. In one embodiment, the different jaw members are supplied pre-sterilized and configured for single use. In one embodiment, the different jaw members a configured for multiple use. In one embodiment, the different jaw members are made of a metal material. In one embodiment, the different jaw members are made of a plastic material.

BRIEF DESCRIPTION OF THE DRAWINGS

In the following, embodiments of the invention are described in detail with reference to the drawings. Throughout the drawings, same elements are denoted with same reference numerals. The drawings schematically show.

DETAILED DESCRIPTION

Figure 1:
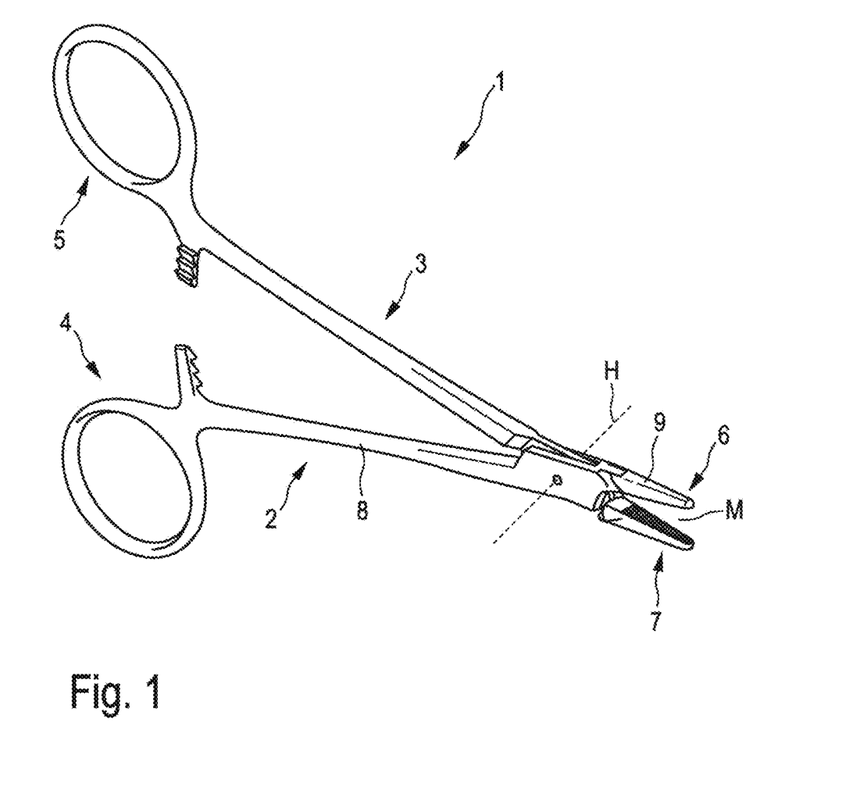
FIG. 1 shows a perspective view of an embodiment of a medical instrument according to the invention, the medical instrument having two instrument branches.

According to FIG. 1, a medical instrument 1 comprises two instrument branches 2, 3, i.e., a first instrument branch 2 and a second instrument branch 3. The two instrument branches 2, 3 are pivotally coupled to each other. In the embodiment shown, the two instrument branches 2, 3 are pivotable relative to each other about a hinge axis H. Each of the two instrument branches 2, 3 has a proximal handling portion 4, 5 and a distal jaw portion 6, 7. The handling portions 4, 5 can also be denoted as first handling portion 4 and second handling portion 5. The jaw portions 6, 7 can also be denoted as first jaw portion 6 and second jaw portion 7. The distal jaw portions 6, 7 form an instrument mouth M which is movable between an open state (see FIG. 1) and a closed state (not depicted in the figures). The instrument mouth M is movable by means of a relative pivotal movement of the instrument branches 2, 3 about the hinge axis H. For closing the instrument mouth M, the jaw portions 6, 7 are moved inwardly toward each other. For opening the instrument mouth M, the jaw portions 6, 7 are moved outwardly away from each other.

In the embodiment shown, the medical instrument 1 is a surgical needle holder. In other embodiments (not shown in the figures), the medical instrument is forceps, a clamp, scissors, or the like. Put in other words, the medical instrument 1 is forceps-like or scissor-like and allows to grip, hold and/or cut medical grade materials or body tissue between the jaw portions 6, 7.

In the embodiment shown, the medical instrument 1 is configured for manual operation in an open surgery. In other embodiments (not shown in the figures), the medical instrument is an endoscopic instrument and/or a robotic arm instrument configured for robotic surgery.

In prior art, medical instruments like needle holders, forceps, clamps or scissors oftentimes feature a two-part design. In such a two-part design each of the instrument branches is formed as a single part with the respective handling portion and jaw portion being formed integral at the proximal end and distal end of the instrument branch, respectively.

In order to facilitate the manufacturing process and to reduce costs, the medical instrument 1 has a modular design instead, wherein at least one of the two instrument branches 2, 3 has a branch member and a separate jaw member, the jaw member being exchangeably attached to the branch member.

Figure 2:
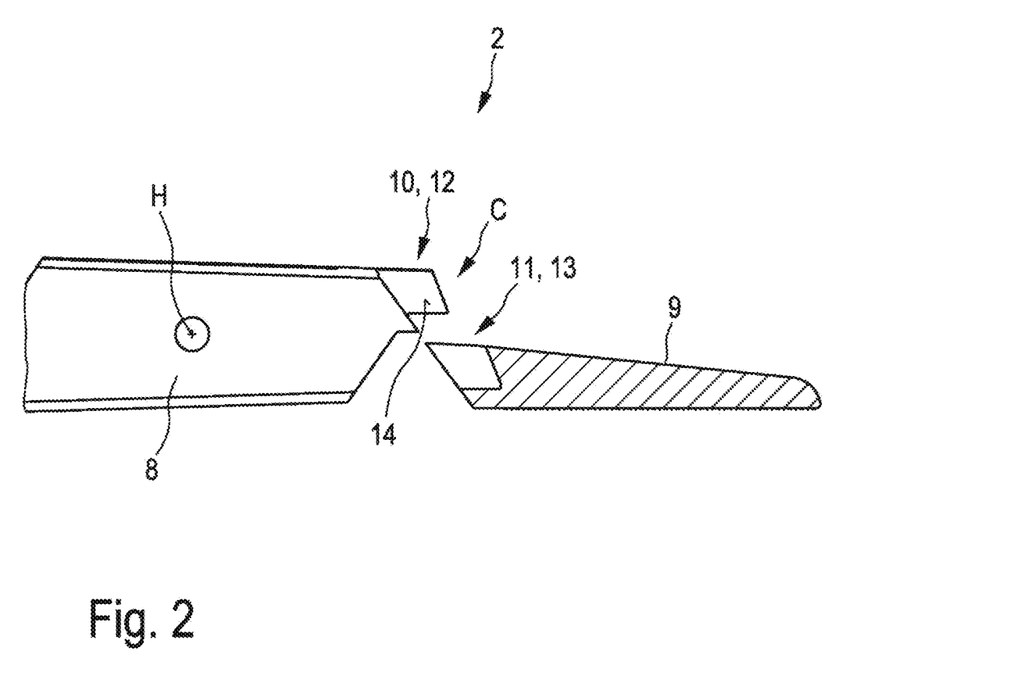
FIG. 2 shows a distal portion of one of the instrument branches in enlarged detail, the instrument branch having a branch member and a jaw member, the jaw member being shown in a longitudinal sectional view.
Figure 3:
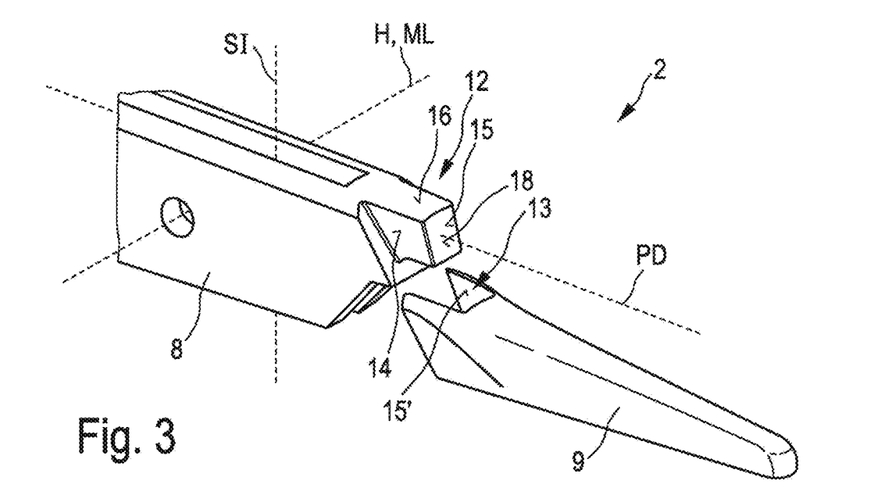
FIG. 3 shows the distal region according to FIG. 2 in a perspective view.

In the embodiment shown, the first instrument branch 2 comprises a branch member 8 and a jaw member 9 (see FIGS. 2, 3). The branch member 8 comprises a distal coupling portion 10. The jaw member 9 comprises a proximal complementary coupling portion 11. The coupling portion 10 and the complementary coupling portion 11 form a releasable connection C to exchangeably attach the jaw member 9 to the branch member 8. Hence, the jaw member 9 is attachable to the branch member 8 by establishing the connection C between the coupling portion 10 and the complementary coupling portion 11. Releasing the connection C allows to detach the jaw member 9 from the branch member 8.

In the prior art, it is known to exchangeably attach the jaw member to the branch member by means of a dovetail joint, wherein the dovetail joint is fastened by means of an additional screw member. The resulting configuration is rather complicated and requires loosening and fastening of the separate screw member manually with the help of a tool to exchange the jaw member.

Figure 4:
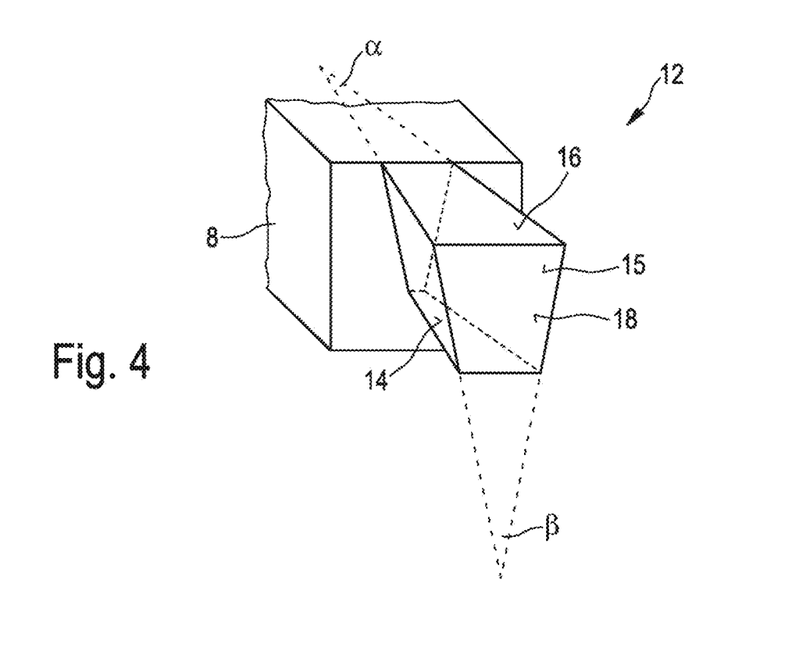
FIG. 4 shows an enlarged perspective view of the distal end of the branch member with a coupling portion formed as wedge-shaped protrusion and configured for releasable connection with a complementary wedge-shaped recess of the jaw member.

In order to arrive at a simplified structure of the medical instrument and to allow a particularly secure attachment as well as a simple and quick exchange of the jaw member 9, the coupling portion 10 is a wedge-shaped protrusion 12 and the complementary coupling portion 11 is a complementary wedge-shaped recess 13, wherein the wedge-shaped protrusion 12 comprises two wedge surfaces 14, 15 opposing each other along a medial/lateral axis ML (see FIGS. 3, 4), wherein the opposing wedge surfaces 14, 15 are inclined in proximal direction toward each other by a first angle of inclination $\alpha$, and wherein the opposing wedge surfaces 14, 15 are inclined inwardly toward each other by a second angle of inclination $\beta$.

The wedge-shaped recess 13 is complementary to the wedge-shaped protrusion 12 with respect to its shape, form and size and will be described in more detail further below.

The branch member 8 is elongated between the wedge-shaped protrusion 12 and the first proximal handling portion 4. The wedge-shaped protrusion 12 is an integral portion of the branch member 8.

In the embodiment shown, the proximal handling portion 4 is integral with the branch member 8. In an embodiment not depicted in the figures, the handling portion is formed as a separate unit and detachably attached to the branch member.

The proximal handling portion 4 forms the proximal end of the branch member 8 and the wedge-shaped protrusion 12 forms the distal end of the branch member 8. The branch member 8 is elongated along a proximal/distal axis PD.

The two wedge surfaces 14, 15 oppose each other along the medial/lateral axis ML and can also be denoted as medial wedge surface 14 and lateral wedge surface 15.

Figure 5:
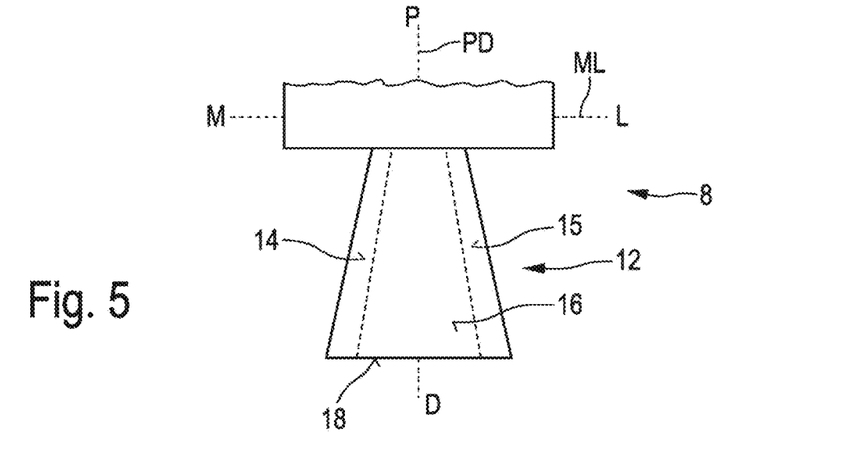
FIGS. 5-7 show the wedge-shaped protrusion in a simplified top view (FIG. 5), front view (FIG. 6) and bottom view (FIG. 7)
Figure 6:
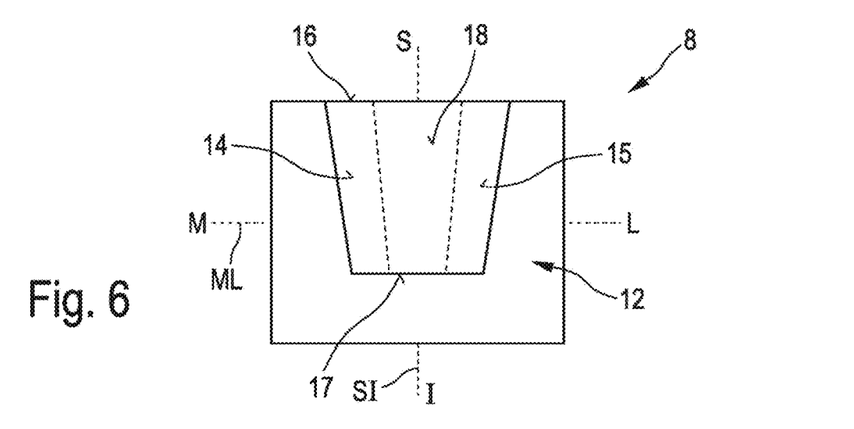
Figure 7:
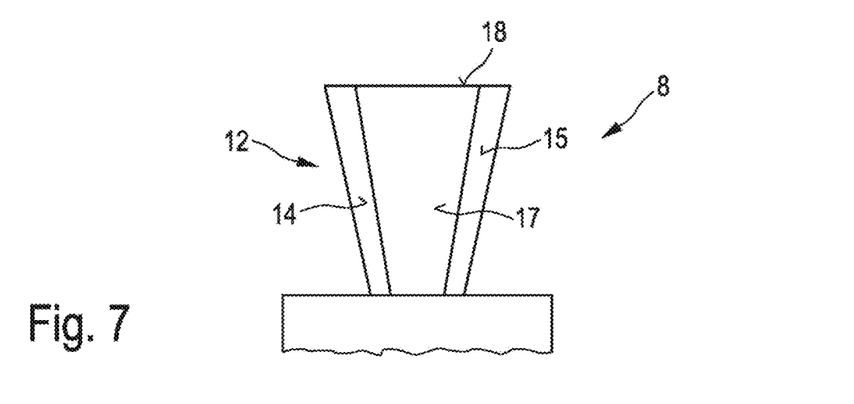

The medial/lateral axis ML and the proximal/distal axis PD are oriented perpendicular to each other. Together with a superior/inferior axis SI said axes PD, ML define a Cartesian reference axes system. FIGS. 5, 6 further clarify the orientation of said axes PD, ML, SI. The proximal/distal axis PD extends between a proximal side (end) P and a distal side (end) D. The medial/lateral axis ML extends between a medial side M and a lateral side L. The superior/inferior axis SI extends between a superior (upper) side S and an inferior (lower) side I.

In the embodiment shown, the wedge-shaped protrusion 12 is symmetrical with respect to a vertically oriented central longitudinal plane of the branch member 8. Said plane extends along the proximal/distal axis PD and along the superior/inferior axis SI. The same holds mutatis mutandis for the complementary wedge-shaped recess 13 of the jaw member 9.

Due to the first angle of inclination $\alpha$ the opposing wedge surfaces 14, 15 converge towards each other in proximal direction and diverge from each other in distal direction.

In the embodiment shown, the first angle of inclination $\alpha$ measures 20°. In other embodiments not depicted in the figures, the first angle of inclination $\alpha$ measures between 10° and 30°.

The second angle of inclination $\beta$ causes the opposing wedge surfaces 14, 15 to converge in inward direction and to diverge in outward direction. Put in other words, the opposing wedge surfaces 14, 15 converge with respect to the closing direction of the instrument mouth M and diverge in opening direction of the instrument mouth M. In yet other words, the opposing wedge surfaces 14, 15 converge towards each other in inferior direction and diverge from each other in superior direction.

In the embodiment shown, the second angle of inclination $\beta$ measures 20°. In other embodiments not shown in the figures, the second angle of inclination $\beta$ measures between 10° and 30°.

In the following, further details of the wedge-shaped protrusion 12 will be described with reference to FIGS. 4 to 7.

In the embodiment shown, the wedge-shaped protrusion 12 also comprises a superior (upper) surface 16 and an opposing inferior (lower) surface 17. The superior surface 16 and the inferior surface 17 oppose each other along the superior/inferior axis SI. The wedge-shaped protrusion 12 also has a proximal end surface 18. In the embodiment shown, the superior surface 16 and the inferior surface 17 are parallel to each other and with respect to a horizontal longitudinal center plane which extends along the proximal/distal axis PD and the medial/lateral axis ML. However, such an orientation of the superior surface 16 and the inferior surface 17 is not mandatory. In the embodiment shown, the proximal end surface 18 is perpendicular with respect to the vertical longitudinal center plane and inclined with respect to a vertical transverse center plane which extends along the medial/lateral axis ML and the superior/inferior axis SI. However, such an inclination of the proximal end surface 18 is not mandatory.

The complementary wedge-shaped recess 13 is configured to snugly receive the wedge-shaped protrusion 12. Since the wedge-shaped recess 13 is complementary to the wedge-shaped protrusion 12 with respect to size, shape and form, it comprises opposing wedge surfaces (wedge recess surfaces) configured for positive engagement and frictional engagement with the wedge surfaces 14, 15 of the wedge-shaped protrusion 12.

Figure 8:
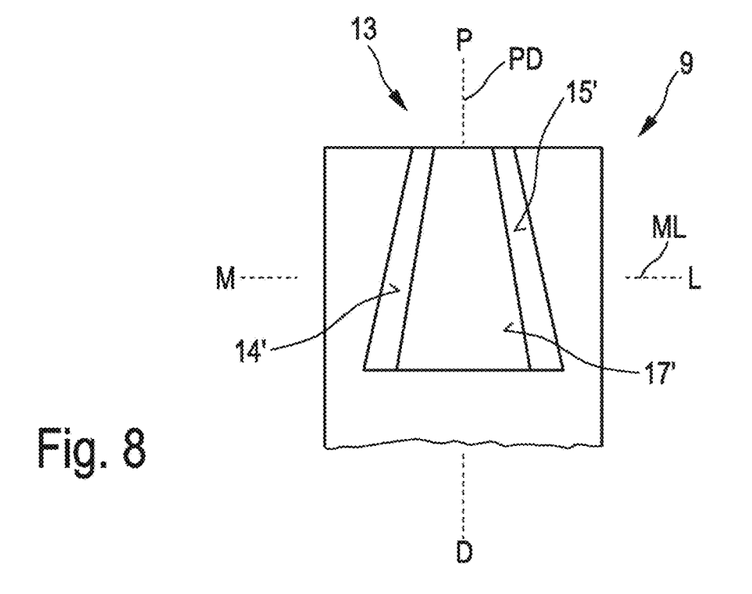
FIGS. 8 and 9 show the wedge-shaped recess of the jaw member in a simplified top view (FIG. 8) and rear view (FIG. 9)
Figure 9:
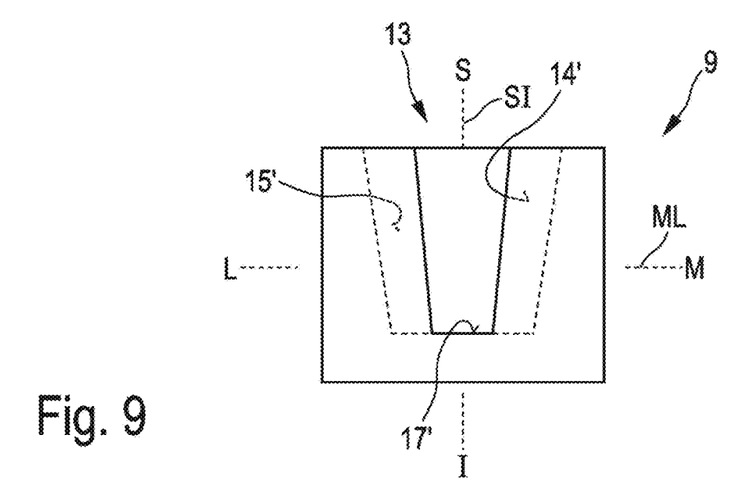

With respect to FIGS. 8 and 9 the wedge-shaped recess 13 comprises opposing wedge recess surfaces 14', 15' which can also be denoted as medial wedge recess surface 14' and medial wedge recess surface 15'. Said surfaces 14', 15' oppose each other along the medial/lateral axis ML and are inclined in proximal direction toward each other by the first angle of inclination $\alpha$. Moreover, the opposing surfaces 14', 15' are inclined inwardly toward each other by the second angle of inclination $\beta$. What has already been disclosed about the inclination of the opposing wedge surfaces 14, 15 of the wedge-shaped protrusion 12 applies analogously to the inclination of the opposing wedge recess surfaces 14', 15'.

In the embodiment shown, the wedge-shaped recess 13 also comprises an inferior (bottom) surface 17'. However, such a bottom surface is not mandatory.

The wedge-shaped recess 13 is open in superior direction.

Starting from the configuration shown in FIG. 3, the jaw member 9 is securely attachable to the branch member 8 by bringing the wedge-shaped protrusion 12 into engagement with the wedge-shaped recess 13. In order to do so, the jaw member 9 is moved outwardly, i.e., from inside to outside with respect to the movement direction of the instrument mouth M, relative to the branch member 8. Once the wedge-shaped protrusion 12 is snugly received within the wedge-shaped recess 13, the opposing wedge surfaces 14, 15 form-fittingly and frictionally engage with the complementary wedge surfaces 14', 15' of the wedge-shaped recess 13. Being attached to the branch member 8, the jaw member 9 is form-fittingly attached in distal direction and superior direction (outward) and securely held in inferior direction (inward) due to the frictional engagement between the wedge surfaces 14, 14' and 15, 15', respectively.

Closing the instrument mouth M and pressing the jaw portions 5, 6 onto each other pushes the wedge-shaped protrusion 12 further into the wedge-shaped recess 13 and causes an enhanced frictional fit. The resulting frictional forces counteract an unintended detachment of the jaw member 9. In the open state of the instrument mouth M, for example, said frictional forces hinder the jaw member 9 from falling off the branch member 8.

Figure 10:
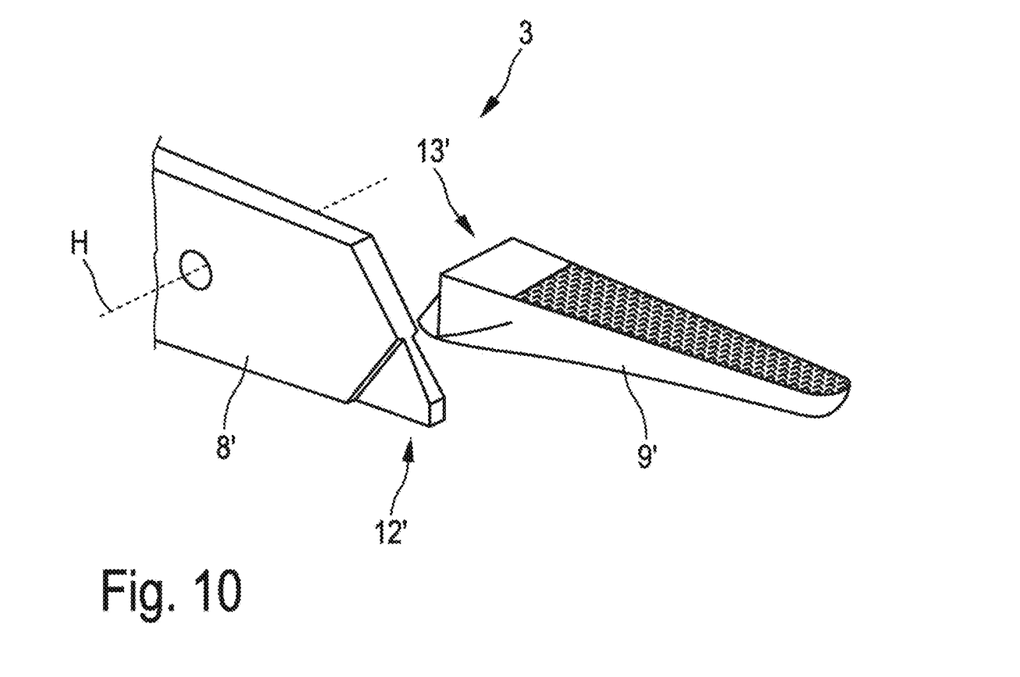
FIG. 10 shows the distal region of the remaining instrument branch of the medical instrument according to FIG. 1 in a view similar to FIG. 3.

In the embodiment shown, the second instrument branch 3 has a similar modular structure with a second branch member 8' comprising a wedge-shaped protrusion 12' and a second jaw member 9' comprising a wedge-shaped recess 13'. This allows an even further simplified structure and yet improved versatility of the medical instrument 1. With respect to further structural and functional features of the wedge-shaped protrusion 12' and the wedge-shaped recess 13' reference is made to the above disclosure. The disclosure with respect to the wedge-shaped protrusion 12 and the wedge-shaped recess 13' applies mutatis mutandis concerning the (further) wedge-shaped protrusion 12' and the (further) wedge-shaped recess 13' of the second instrument branch 3, respectively.

Figure 11:
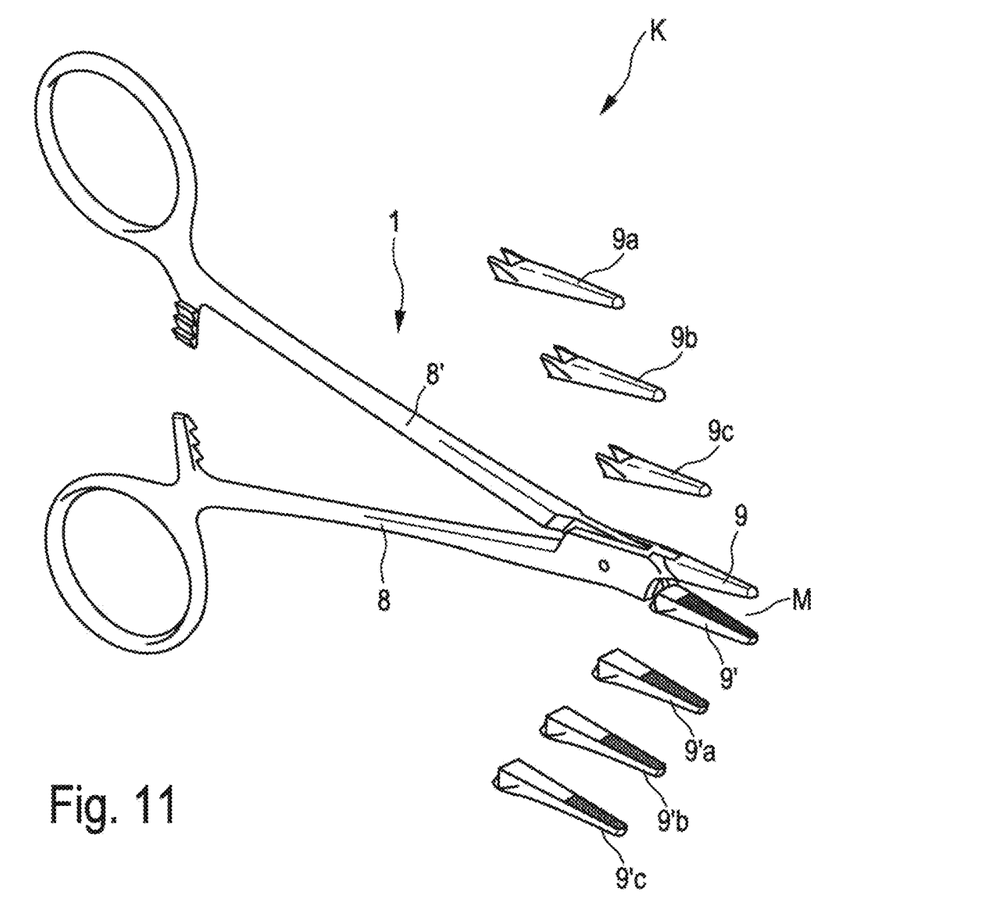
FIG. 11 shows a perspective view of an embodiment of a kit according to the invention.

According to FIG. 11 a kit K comprises the medical instrument 1 and a plurality of different jaw members 9a, 9b, 9c, 9'a, 9'b, 9'c. Said different jaw members comprise identical complementary coupling portions in the form of the wedge-shaped recess 13. However, the wedge-shaped recesses 13 are not depicted in greater detail in FIG. 11. Said different jaw members differ with respect to size, shape, form and/or function. In this context, the different jaw members 9a, 9b, 9c can also be denoted as first alternative upper jaw member 9a, second alternative upper jaw member 9b and third alternative upper jaw member 9c. Each of said alternative upper jaw members is detachably attachable to the (first) branch member 8 instead of the (first) jaw member 9. The different jaw members 9'a, 9'b, 9'c can also be denoted as first alternative lower jaw member 9'a, second alternative lower jaw member 9'b and third alternative lower jaw member 9'c. Said alternative lower jaw members are detachably attachable to the second branch member 8' instead of the second jaw member 9'.

The invention claimed is:

1. A medical instrument, comprising:
   a first instrument branch and a second instrument branch pivotally coupled to the first instrument branch,
   each of the first instrument branch and the second instrument branch having a proximal handling portion and a distal jaw portion,
   the distal jaw portions forming an instrument mouth which is movable by a pivotal movement of the first instrument branch and the second instrument branch between a closed state, in which the distal jaw portions are moved inwardly toward each other, and an open state, in which the distal jaw portions are moved outwardly away from each other,
   at least one of the first instrument branch and the second instrument branch comprising a branch member and a jaw member, the branch member being elongated along a proximal/distal axis and having one of the proximal handling portions and a distal coupling portion, the jaw member forming one of the distal jaw portions and having a proximal complementary coupling portion,
   the distal coupling portion and the proximal complementary coupling portion forming a releasable connection to exchangeably attach the jaw member to the branch member,
   the distal coupling portion is comprising a wedge-shaped protrusion and the proximal complementary coupling portion is comprising a complementary wedge-shaped recess, or vice versa,
   the wedge-shaped protrusion comprising two wedge surfaces opposing each other along a medial/lateral axis, the two wedge surfaces being inclined in a proximal direction toward each other by a first angle of inclination, and
   the two wedge surfaces being inclined inwardly toward each other by a second angle of inclination.

2. The medical instrument according to claim 1, wherein the first angle of inclination measures between 10° and 30°.

3. The medical instrument according to claim 1, wherein the second angle of inclination measures between 10° and 30°.

4. A kit comprising:
   the medical instrument according to claim 1; and
   a plurality of different jaw members, each of the plurality of different jaw members being interchangeable with the jaw member of the medical instrument,
   the plurality of different jaw members comprising identical complementary coupling portions configured for releasable connection to the distal coupling portion of the branch member of the medical instrument, and
   the identical complementary coupling portions each being identical to the proximal complementary coupling portion of the jaw member of the medical instrument.

* * * * *